April 2, 1957     R. P. LAPSLEY     2,787,651
ELECTRIC CABLE SYSTEM
Filed Jan. 17, 1950
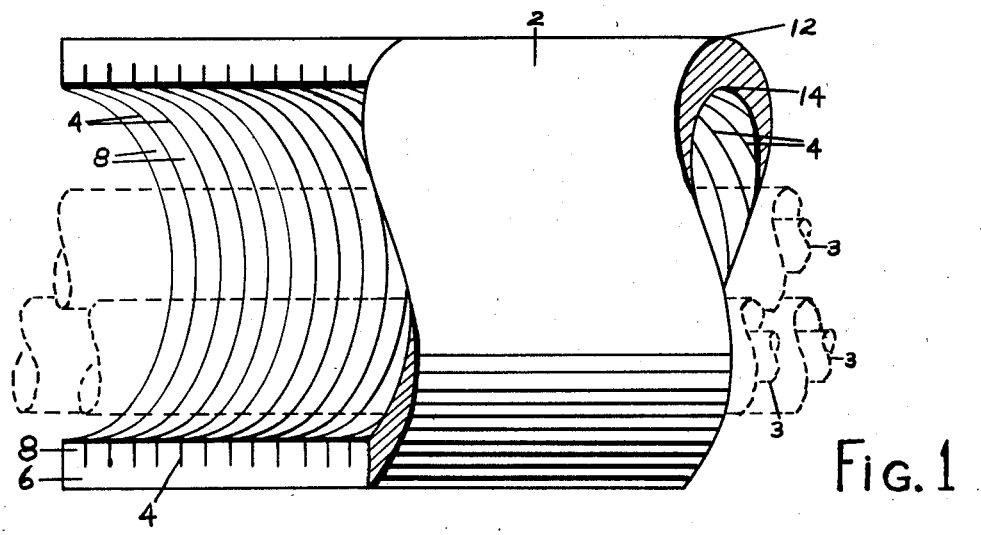
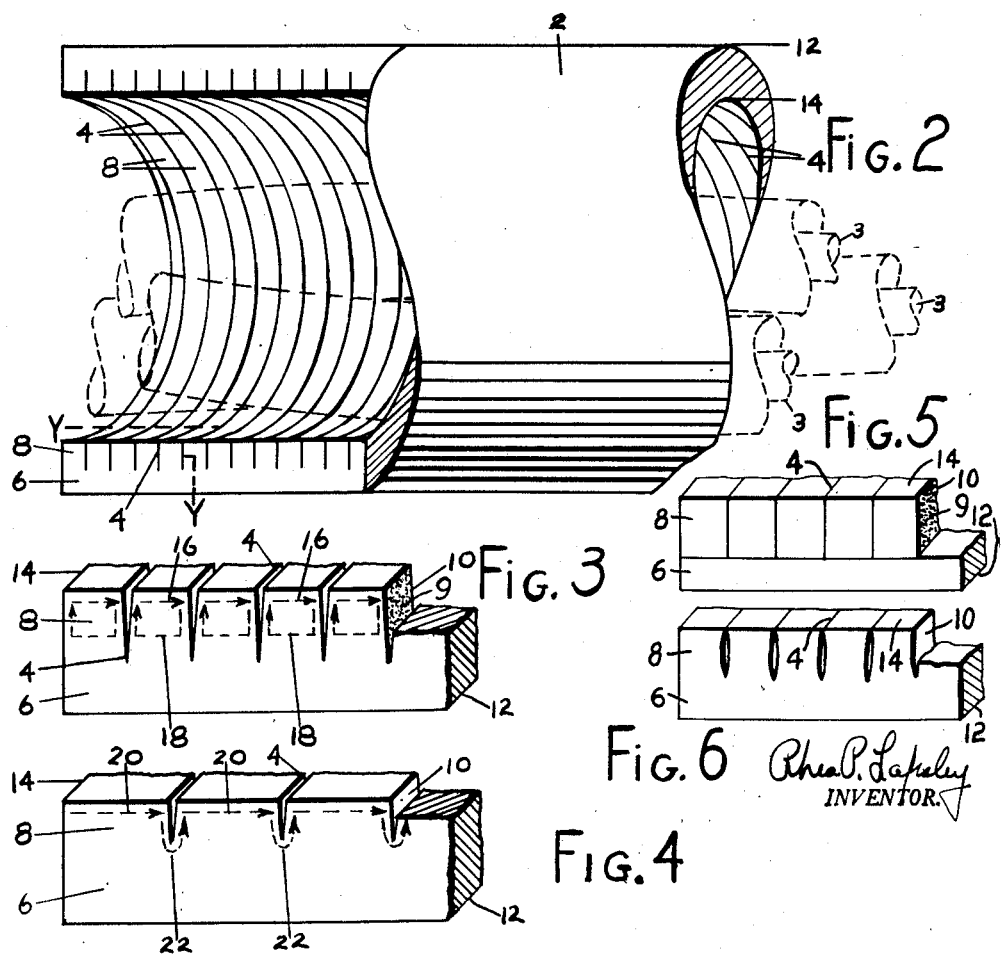
Rhea P. Lapsley
INVENTOR.

United States Patent Office 2,787,651
Patented Apr. 2, 1957

2,787,651

ELECTRIC CABLE SYSTEM

Rhea P. Lapsley, Ridgewood, N. J., assignor to The Okonite Company, Passaic, N. J., a corporation of New Jersey Application January 17, 1950, Serial No. 138,976

4 Claims. (Cl. 174—32)

My invention relates to polyphase electric cable systems of the type wherein a plurality of insulated conductors are encased within a metallic raceway, for example a pipe, composed of magnetic material.

One object of my invention is to provide a raceway of such construction that the magnitude of energy losses occurring in the raceway wall and within the cable system will be reduced.

A further object of my invention is to reduce the alternating current resistance and reactance of the cable system and to reduce the voltage drop occurring within the cable system.

A still further object of my invention is to provide a raceway construction whereby the cable circuit can carry more load current.

In the accompanying drawings,

Fig. 1 is a part-sectional view of one embodiment of my invention;

Fig. 2 is a similar view of a modified embodiment of my invention, and

Fig. 3 and Fig. 4 are enlarged sectional views of the portion of Fig. 2, bounded approximately by the line Y—Y, showing alternative details, which are also applicable to other embodiments of my invention.

Fig. 5 is an enlarged sectional view similar to Fig. 3 showing a further modification of the invention.

Fig. 6 is a view similar to Fig. 3 showing an alternative form of the invention.

For clarity of explanation, my invention will be described in connection with pipe-encased three-phase power cable circuits. It is understood, however, that my invention is applicable to other types of alternating current cable systems and to other types of magnetic raceways, including, but not limited to, joint casings and metallic parts of other accessories of cable systems.

In conventional practice when three insulated conductors are encased in a metallic raceway for the full length of the raceway, and three-phase alternating current is passed over the conductors, a two-pole rotating magnetic field extending the full length of the raceway is created.

The strength of the magnetic field increases as the amperes of current in the conductors are increased.

For simplicity of explanation, it is assumed that this magnetic field is composed of magnetic flux lines extending across the raceway interior between and across the conductors, penetrating the raceway wall, dividing into two groups which extend clockwise and counterclockwise partially around the raceway within the raceway wall, and emerging on the interior surface of the raceway wall and again extending across the raceway interior. The portions of the interior surface of the raceway wall at which the magnetic flux lines simultaneously enter and emerge are referred to as the north and south magnetic poles. These poles extend for the full length of the raceway, and the longitudinal axes of the magnetic poles are substantially in the same general direction within the raceway wall as the direction of lay of the conductor group.

This whole two-pole magnetic field is caused to rotate by the alternations of the currents in the three conductors. The speed of rotation depends on the frequency of current alternations.

Voltages are induced in the full length of the interior portion of the raceway wall as the magnetic field revolves and the moving magnetic flux lines are cut by the stationary raceway wall.

These voltages are induced in opposite directions at the north and south poles of the rotating magnetic field. The paths of these longitudinal induced voltages rotate around the inside periphery of the raceway wall in the same direction and at the same speed as the magnetic poles. Thus, with respect to the stationary raceway wall, the induced voltages are alternating voltages.

The induced voltage at the north magnetic pole causes induced current to flow longitudinally in one direction in the portion of the raceway wall which is cutting the magnetic flux lines at the north magnetic pole, and the induced voltage at the south magnetic pole causes induced current to flow longitudinally in the opposite direction in the portion of the raceway wall which is cutting the magnetic flux lines at the south magnetic pole. At the ends of the raceway circuit these induced currents cross over circumferentially in the raceway wall from one longitudinal current path to the other and thus form a closed series path of induced current flow.

The influence of these circumferential cross-over portions of the current path is relatively small for circuits of considerable length and will, therefore, be neglected. For clarity, a section of the circuit remote from the ends will be assumed hereafter.

The longitudinal paths of flow of induced currents rotate around the inside periphery of the raceway wall at the same speed as the paths of induced voltages. Thus, with respect to the stationary raceway wall, the induced currents are alternating currents.

In raceways composed of magnetic materials, these longitudinal currents are induced and flow primarily in a reasonably thin interior portion of the raceway wall, which we shall call the inner skin. This inner skin will be considerably thinner in raceways composed of magnetic materials than in raceways composed of non-magnetic materials. The fact that the skin depth of flow of induced currents is so thin in raceways composed of magnetic materials permits the accomplishment of a reduction in losses therein by use of my invention, whereas the invention is not operative for use with raceways composed of non-magnetic materials.

The density of current per unit cross sectional area of raceway wall is greatest at the inner surface of the raceway wall and decreases with radial depth of penetration into the raceway wall and with circumferential distance from the center of each revolving magnetic pole.

As the paths of flow of the induced currents rotate about the inside periphery of the raceway wall, each cross sectional portion of the raceway wall inner skin is subjected to longitudinal induced current flow which rises to a maximum, recedes to zero, rises to a maximum in the opposite direction, and recedes to zero again for each complete revolution of the magnetic poles or cycle of the current.

The induced alternating currents flowing in this inner skin cause an appreciable energy loss within the raceway wall when currents of considerable magnitude are flowing in the conductors. For example, in a circuit composed of large conductors, such as 1,000 MCM or larger, carrying currents of the order of several hundred to a thousand or more amperes per phase at a frequency of 60 cycles per second, this energy loss within the raceway wall is a very appreciable quantity.

The induced currents also increase the alternating current resistance and reactance of the circuit, increase the voltage drop within the circuit, and reduce the load current carrying capacity.

A significant reduction of the energy loss within the raceway wall and of the resistance and reactance of the circuit, and an increase in load current carrying capacity will be of great economic benefit.

Referring to the embodiment of my invention illustrated in Fig. 1: 2 designates a raceway for the loose reception of insulated power cable conductors 3 (which, for clarity, are shown in broken lines). The raceway has an unbroken exterior, but its interior is provided with closely spaced slits or incisions 4 which extend circumferentially of the raceway and radially partially through the raceway wall 6. The slits 4 are too narrow to be occupied by the cable conductors and constitute but a small part of the wall volume. By thus slitting the raceway I divide the interior portion of the raceway wall into a multiple number of laminae 8.

In the embodiment of my invention illustrated in Fig. 2: 2 designates a raceway for the reception of insulated power cable conductors 3 (which, for clarity, are shown in broken lines). The raceway of this embodiment has an unbroken exterior, but interiorly is provided with closely spaced circumferential slits or incisions 4 extending helically along the interior periphery and radially partially through the raceway wall 6. Here again the slits are too narrow to be occupied by the cable conductors and constitute but a small part of the wall volume, and divide the interior portion of the raceway wall into a multiple number of laminae 8.

The slits 4 are formed into the raceway wall 6 at approximate right angles to the paths of flow of induced currents. If the individual conductors lie in a relatively straight path within the raceway, it is preferable that the slits 4 extend, as illustrated in Fig. 1. If the conductors be twisted together, it is preferable that the slits 4 extend, as illustrated in Fig. 2, with the direction of rotation and angle of the helix or helixes such as to provide electrical discontinuities in the inner portion of the raceway wall at approximate right angles to the paths of flow of induced currents.

In cases where the slits 4 vary somewhat from right angles to the paths of flow of induced currents, the slits may be spaced closer together in order to secure the same reduction of energy losses as if the electrical discontinuities were at right angles to the paths of flow of induced currents.

The slits 4, whether as illustrated in Fig. 1 or as illustrated in Fig. 2, will, for simplicity and without limitation, hereafter be assumed to be at approximate right angles to the paths of flow of induced currents.

The slits 4 are spaced at relatively close intervals, for example, in the order of small fractions of an inch. The slits 4 laminate the raceway wall approximately as deep as, or deeper than, the major portion of the revolving magnetic field penetrates the raceway wall, for example, in the order of small fractions of an inch. The closer together and the deeper the slits are, within reasonable limits, the better results will be. This spacing and depth will be dictated by economy, considering cable size, insulation thickness, current to be carried, frequency of current, thickness of raceway wall, material of which the raceway is composed, pressure within the raceway, and other factors, for each type application.

In normal practice the raceway is for example ¼" to ½" thick steel, and my slits, incisions or laminations may be for example ⅛" deep without reducing the rigidity or beam strength of the raceway below desirable values.

The slits 4 may be cut, rolled, or formed by other means, into the interior wall of the raceway. To cut or roll the slits, a tool head supporting cutting tools or pipe cutter wheels presses the cutting edges into the raceway interior wall as the tool head is revolved, thereby forming a slit. This process may be repeated a multiple number of times to form a multiplicity of slits circumferentially within the raceway. The slits 4 may be formed helically in a continuous operation by advancing the cutting edges longitudinally through the raceway as they are revolved around the raceway interior.

As an alternative, when the raceway is manufactured from plate, rolled into tubular form and longitudinally or helically welded to close the seam, the slits 4 can be cut, rolled, or formed by other means, into the plate prior to shaping the plate into tubular form. The fact that the welding process obliterates the slits at the weld will be of little consequence as an insignificant portion of the raceway circumference will be so effected.

As a further alternative, I may provide a structure equivalent to that already described by lining the raceway with pieces of metal entirely separate from the outer portions of the raceway wall, as shown in Fig. 5.

The interior surface of the raceway may be pressed, rolled or otherwise smoothed after forming the slits 4, to facilitate installation of the cable conductors.

Oxide or other insulating film media 9 will form on the interior walls 10, Fig. 3, of the slits 4 from exposure to air during or subsequent to forming the slits. If the raceway is filled with oil to surround the cables, an oil film will enter the slits. These films of insulating media appear to be disposed on edge within the raceway wall. These films on the interior walls 10 of the slits (or between the separate laminae 8, Fig. 5) will constitute electrical discontinuities which will prevent passage of induced currents across the slits, even if the interior walls or top edges of the slits are pressed, rolled or otherwise caused to become contiguous as illustrated in Fig. 6 for a one piece laminated raceway and as illustrated in Fig. 5 where the laminations are pieces of metal separate from the outer portion of the raceway wall.

It is not normally necessary to take special measures to increase the insulating quality of the film within the slits 4; however, the electrical discontinuities may be further augmented by application of insulating material within the slits, for example lacquer, or by prolonged exposure to air or heating of the raceway in the presence of air to cause oxidation of the walls of the slits, or by other means.

In operation of my invention, longitudinal alternating voltages are induced in the inner skin of the raceway wall in a manner similar to that described in connection with conventional practice. However, the electrical discontinuities break up these voltages into small increments. As the insulation of film within the slits is sufficient to resist these small increments of induced voltage, the longitudinal paths of flow of induced currents in the inner skin of the raceway are interrupted by the electrical discontinuities.

With suitably close spacing of slits and/or suitably deep depth of slits, the induced currents flow in small eddy paths, bounded by the physical dimensions of the laminae 8, as shown diagrammatically in Fig. 3, wherein 12 designates the exterior surface of the raceway wall, 14 the interior surface of the raceway wall, 4 the slits, 8 the laminae, and 16 and 18 designate portions of the eddy path of flow of the induced currents in each laminae.

With relatively wide spacing of the slits and/or relatively shallow depth of slits, the relationship will be such that induced currents flow longitudinally in the raceway wall, as shown diagrammatically in Fig. 4, wherein 12 designates the exterior surface of the raceway wall, 14 the interior surface of the raceway wall, 4 represents the slits, 8 the laminae, and 20 and 22 designate portions of the longitudinal path of flow of induced current.

In either case, the current induced in the raceway wall is alternating current and the direction of induced current flow will reverse in each portion of the raceway wall with each one-half revolution of the magnetic poles.

In conventional practice, the path over which voltage is induced in the raceway wall at each magnetic pole and the path of flow of induced current in the raceway wall extend from end to end of the raceway, and said paths are of identical length, except for the relatively short end cross-over paths in which currents flow but no voltage is induced. Therefore, neglecting the short end cross-over paths, the ratio of the length of paths of induced voltage and the length of paths of induced current are one to one, regardless of the raceway length.

With my invention, voltage is induced in that portion 16, Fig. 3, of the eddy path of flow of induced current which is closest to the raceway interior surface, as this is the portion of the path of flow of induced current that is cut by the revolving magnetic flux. However, the induced current also flows in a portion 18 of the eddy path, which is deeper in the raceway wall and in which no voltage is induced. This portion 18 of the eddy path of flow of induced current is as long as, or longer than, the portion 16. Therefore, the ratio of the length of paths of flow of induced currents to the length of paths of induced voltage is of the order of two to one, or higher, and the resistance of each increment of the paths of flow of induced currents is thereby considerably increased. Due to the increase in resistance of the paths of flow of induced currents, the induced currents will be considerably reduced in magnitude, resulting in reduced energy losses, lower conductor resistance and reactance, less voltage drop through the system, and greater load current carrying capacity.

Similarly, when the spacing and depth of slits are such that longitudinal induced currents flow, as illustrated by 20 and 22, Fig. 4, voltage is induced primarily in the portion 20 of the path of flow of induced current which is closest to the interior surface of the raceway, but the induced current has to change direction and take a deeper path 22 in the raceway wall at each slit, and the effective length of the path of flow of induced current is thereby lengthened and the resistance of the path is increased, with respect to the length of path of induced voltage, resulting in smaller induced currents within the raceway wall, with beneficial changes in circuit characteristics, as stated above.

It is understood the details of construction, arrangement, and dimensions of the parts hereinabove described and shown on the accompanying drawings may be varied within the purview of my invention.

What I claim is:

1. An alternating current low frequency, high tension power cable system comprising in combination, a raceway of magnetic materials; insulated cable conductors loosely disposed within said raceway; the raceway having an unbroken exterior; the interior of said raceway throughout its length being provided with slits extending circumferentially of the raceway, said slits being too narrow to be occupied by the cable and constituting but a small part of the wall volume.

2. A raceway of magnetic materials for the reception of polyphase electric cable, the raceway having an unbroken exterior; the interior of the raceway throughout its length being provided with slits extending circumferentially of the raceway; said slits being too narrow to be occupied by the cable and constituting but a small part of the wall volume.

3. An alternating current cable system comprising in combination, a raceway of magnetic materials; insulated cable conductors loosely disposed within said raceway; the raceway having an unbroken exterior; the interior of said raceway throughout its length being slitted helically of the raceway; the slits being too narrow to be occupied by the cable and constituting but a small part of the wall volume.

4. A raceway of magnetic materials for the reception of polyphase electric cable, the raceway having an unbroken exterior; the interior of the raceway throughout its length being slitted helically; the slits being too narrow to be occupied by the cable and constituting but a small part of the wall volume.

References Cited in the file of this patent

UNITED STATES PATENTS

| | | |
|---|---|---|
| 1,370,731 | Chase | Mar. 8, 1921 |
| 1,574,076 | Fisher | Feb. 23, 1926 |
| 1,959,339 | Bennett | May 22, 1934 |
| 1,959,354 | Everest | May 22, 1934 |
| 1,962,876 | Reinert et al. | June 12, 1934 |
| 2,068,940 | Wiseman | Jan. 26, 1937 |
| 2,082,649 | Nageli | June 1, 1937 |
| 2,189,207 | Heath | Feb. 6, 1940 |
| 2,417,785 | Slepian | Mar. 18, 1947 |
| 2,491,692 | Shimek | Dec. 20, 1949 |
| 2,718,542 | Lapsley | Sept. 20, 1955 |

FOREIGN PATENTS

| | | |
|---|---|---|
| 390,500 | Great Britain | Apr. 3, 1933 |